(12) United States Patent
Viswanadham et al.

(10) Patent No.: US 9,363,628 B2
(45) Date of Patent: *Jun. 7, 2016

(54) RANGE MANAGEMENT WITH BLUETOOTH LOW ENERGY

(71) Applicant: Google Inc., Mountain View, CA (US)

(72) Inventors: Prerepa V. Viswanadham, Mountain View, CA (US); Wei Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,649

(22) Filed: May 19, 2015

(65) Prior Publication Data
US 2016/0021488 A1 Jan. 21, 2016

Related U.S. Application Data

(63) Continuation of application No. 14/334,763, filed on Jul. 18, 2014, now Pat. No. 9,107,026.

(51) Int. Cl.
H04B 5/00 (2006.01)
H04W 4/00 (2009.01)
H04W 8/00 (2009.01)
H04B 7/00 (2006.01)
H04W 48/16 (2009.01)
H04W 84/18 (2009.01)

(52) U.S. Cl.
CPC ............... *H04W 4/008* (2013.01); *H04W 8/005* (2013.01); *H04W 48/16* (2013.01); *H04W 84/18* (2013.01); *Y02B 60/50* (2013.01)

(58) Field of Classification Search
CPC .............................. H04W 4/008; H04W 8/005
USPC ................................. 455/41.1, 41.2
See application file for complete search history.

(56) References Cited

U.S. PATENT DOCUMENTS 9,107,026 B1 * 8/2015 Viswanadham ...... H04W 8/005
2010/0317289 A1 * 12/2010 Desai ................... H04B 17/318
455/41.2

* cited by examiner

*Primary Examiner* — Ayodeji Ayotunde
(74) *Attorney, Agent, or Firm* — McDonnell Boehnen Hulbert and Berghoff LLP

(57) ABSTRACT

An example method for adjusting the range of transmission of advertising packets is disclosed. In particular, method includes receiving, from an application executing on a mobile computing device, a request. The request may include a request to transmit an advertisement packet via a short-range wireless device of the computing device. Additionally, the request may include a power level for the transmission of the advertisement packet via the short-range wireless device. Additionally, the method may include causing the transmission, via the short-range wireless device, of the advertisement packet. The short-range wireless device may be configured to transmit the advertisement packet at a transmission power level less than or equal to the requested power level. Further, the requested power level may be less than or equal to a nominal power level for the short-range wireless device.

20 Claims, 9 Drawing Sheets

| Application | Payment Application | Audio Application | Find a Friend Application | Location Detection Application |
|---|---|---|---|---|
| Range | 1 foot | 4 feet | 100 feet | 50 feet |
| Power Level | -60 dBm | -28 dBm | 10 dBm | -4 dBm |
| API | Payment | Personal Audio | Friend Finder | Location |

FIG. 6

RANGE MANAGEMENT WITH BLUETOOTH LOW ENERGY

CROSS REFERENCE TO RELATED APPLICATIONS

The present application is a divisional application of, and claims priority to, U.S. patent application Ser. No. 14/334,763, filed on Jul. 18, 2014, the entire contents of which are herein incorporated by reference.

BACKGROUND

Unless otherwise indicated herein, the materials described in this section are not prior art to the claims in this application and are not admitted to be prior art by inclusion in this section.

Portable computing devices such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One short-range wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to the audio speakers and a microphone of a motor vehicle, possibly allowing for hands-free use of the phone while operating the vehicle. Thus, numerous applications have allowed Bluetooth to grow as the standard wire-replacement protocol. In multiple applications, Bluetooth remains particularly attractive due to its low-cost solutions and protocols designed for low power consumption.

SUMMARY

Example embodiments herein disclose methods, computing devices, and computer-readable media a capable of providing controlling a transmit power associated with advertisements from a short-range wireless device, such as a Bluetooth device. By controlling the transmit power associated with advertisements, the short-range wireless device can control the range at which the advertisements can be received.

In one example, a method is provided. The method includes receiving, from an application executing on a mobile computing device, a request. The request may include a request to transmit an advertisement packet via a short-range wireless device of the computing device. Additionally, the request may include a power level for the transmission of the advertisement packet via the short-range wireless device. The request may be received via an application programming interface (API) exposed to the application. Additionally, the method may include causing the transmission, via the short-range wireless device, of the advertisement packet. The short-range wireless device may be configured to transmit the advertisement packet at a transmission power level less than or equal to the requested power level. Further, the requested power level may be less than or equal to a nominal power level for the short-range wireless device.

In another example, a short-range wireless device is provided. The short-range wireless device may include a processor and a transmitter, configured to transmit, one or more advertisement packets with a power level less than or equal to a determined power level for a respective advertisement packet. Additionally, the short-range wireless device may include a computer readable medium having stored thereon program instructions that when executed by the processor cause the computing device to perform functions. Further, the functions include receiving, from an application executing on a mobile computing device, a request. The request may include a request to transmit an advertisement packet via a short-range wireless device of the computing device. Additionally, the request may include a power level for the transmission of the advertisement packet via the short-range wireless device. The request may be received via an application programming interface (API) exposed to the application. Additionally, the functions may include causing the transmission, via the short-range wireless device, of the advertisement packet. Further, the requested power level may be less than or equal to a nominal power level for the short-range wireless device.

In still another example, a computer-readable medium is provided. The computer-readable medium has stored thereon program instructions that when executed by a processor, causes performance of functions in connection with a short-range wireless device. Further, the functions include receiving, from an application executing on a mobile computing device, a request. The request may include a request to transmit an advertisement packet via a short-range wireless device of the computing device. Additionally, the request may include a power level for the transmission of the advertisement packet via the short-range wireless device. The request may be received via an application programming interface (API) exposed to the application. Additionally, the functions may include causing the transmission, via the short-range wireless device, of the advertisement packet. The short-range wireless device may be configured to transmit the advertisement packet at a transmission power level less than or equal to the requested power level. Further, the requested power level may be less than or equal to a nominal power level for the short-range wireless device.

In yet a further example, an apparatus is provided. The apparatus includes means for receiving, from an application executing on a mobile computing device, a request. The request may include a request to transmit an advertisement packet via a short-range wireless device of the computing device. Additionally, the request may include a power level for the transmission of the advertisement packet via the short-range wireless device. The request may be received via an application programming interface (API) exposed to the application. Additionally, the apparatus may include means for causing the transmission of the advertisement packet. The means for transmission may be configured to transmit the advertisement packet at a transmission power level less than or equal to the requested power level. Further, the requested power level may be less than or equal to a nominal power level for the short-range wireless device.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6 shown an example chart of various applications, the associated transmission range, power level, and application programming interface (API).

DETAILED DESCRIPTION

Figure 1:
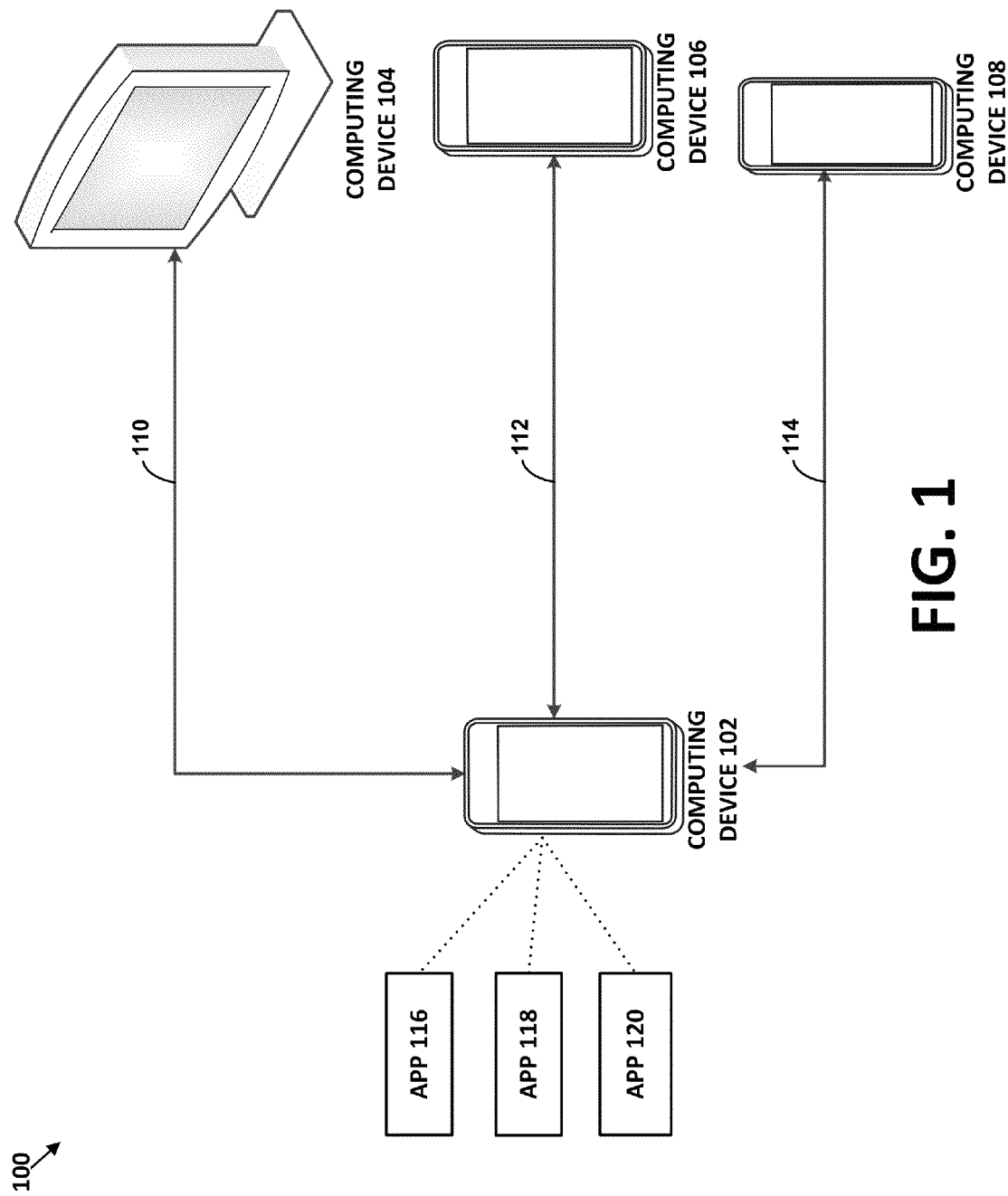
FIG. 1 illustrates an example computing device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein. While the following detailed description generally refers to Bluetooth technology, it may also be applicable to other short-range wireless technologies.

As noted, Bluetooth continues to grow as the standard wire-replacement protocol and remains particularly attractive due to its protocols designed for low power consumption. In particular, Bluetooth Low Energy (BLE) provides protocols for low-power devices to communicate with multiple other computing devices. For example, consider a computing device that can be powered by one or more batteries. Further, consider that the computing device utilizes BLE's protocols for communicating with other computing devices such as wireless headsets and payment devices. For example, a music-playing application on the computing device may stream music to the wireless headset. In particular, BLE's protocols may include a BLE advertising protocol (possibly referred to herein as an "advertising protocol" or "advertising packets") such that the computing device may "advertise" or announce its presence to other computing devices such as the wireless headset, possibly to "pair" or connect the computing device with the wireless headset. As such, advertising protocols are designed to allow the computing device to pair with the wireless headset while maintaining the computing device's low power consumption.

Additionally, BLE may enable the computing device to also simultaneously interact with more than one device at a time. For example, a computing device may advertise to make a payment to a payment device while also making an advertisement to either pair with a wireless headset or a different nearby computing device. Thus, an advertisement may be transmitted to initiate a connection with a second device while pairing with a first device is ongoing.

There are several other advantages to BLE's advertising protocols. For example, considering the scenario above, the computing device may pair with the wireless headset faster using advertising protocols than by using other protocols. In particular, advertising protocols may be fixed to three channels of a wireless spectrum, e.g., the 2.4 GHz wireless spectrum. Thus, by not scanning the full wireless spectrum, the wireless headset may communicate and pair with the computing device over the three fixed channels, allowing for sending and receiving BLE advertisement packets (possibly referred to herein as "advertisement packets") faster than the other protocols.

Yet, one of the challenges to using advertising protocols is related to limitations of the advertisement packets. For example, consider another scenario in which the computing device has the music-playing application described above and also a payment application. The payment application may allow a user to communicate financial data from a computing device to a payment device to facilitate a transaction. For example, rather than swiping a credit card, the computing device may communicate payment information to a payment device via BLE. Thus, the computing device may attempt to send advertisement packets to both the wireless headset and a payment device for pairing with both devices. However, due to the physical distance between the computing device and both the wireless headset and the payment device that the advertisement packets are targeted for, it may be desirable to adjust a transmission range for the advertisement packets. As such, a transmission power associated with advertisement packets may be adjusted based on the application transmitting the advertisement package.

Therefore, embodiments herein provide example methods, short-range wireless devices, and computer-readable mediums for adjusting a transmission power associated with advertisement packets based on an application transmitting the advertisement package. Thus, a single advertising device, e.g., the computing device, may send multiple advertisement packets to multiple listening devices, e.g., the wireless headset and the payment device. In particular, each of the advertisement packets may have a desired range of reception. Further, the range of reception may be based on the application that is causing the advertisement packet to be transmitted. As such, the whether or not devices listening for an advertisement packet, e.g., the wireless headset and the payment device, may perceive each advertisement packet may depend on the range between the device transmitting the advertising packet and the devices listening for an advertisement packet. As such, in the scenario above, the computing device may control the range for the various advertisements based on transmitting each advertisement with a power level based on the desired advertisement range. Thus, before transmitting an advertisement packet, the computing device may determine the application causing the advertisement packet to be transmitted and responsively adjust the advertisement packet transmission power to control the range at which the advertisement packet can be received.

FIG. 1 illustrates an example computing device. As shown in scenario 100 of FIG. 1, computing device 102 may be illustrated a smart phone (i.e. computing device), computing device 104 may be illustrated as a digital television or a monitor, computing device 106 may be illustrated as a table computer, and computing device 108 may be illustrated as another smart phone. Yet, it should be understood that arrangements for computing devices 102 through 108 are provided in FIG. 1 are for purposes of illustration only. For example, computing device 102 may also be the computing device as described in the scenarios above, among other types of wearable computing devices. In addition, in some instances, the computing devices 102 may be a laptop computer, a tablet computer, and/or a human-interface device, among other possibilities. As such, the computing device 102 may, for example, take the form of any of the computing devices described above in relation to the transmission of advertising packets for a number of applications for adjusting a transmission power associated with advertisement packets based on an application transmitting the advertisement package.

Further, as shown in FIG. 1, computing device 102 may pair or connect with a number of other computing devices. For example, computing device 102 may pair or connect to computing device 104 through connection 110. Further, computing device 102 may also pair or connect with computing device 106 through connection 112. Yet further, computing 102 may also pair or connect with computing device 108 through connection 114. In addition, connections 110, 112, and 114 may be point-to-point wireless connections such as BLUETOOTH® connections and/or Bluetooth Low Power Energy (LPE) connections, among other types of connections.

In some instances, computing device 102 may determine a number of applications. For example, applications 116, 118, and 120 may, for example, be downloaded on computing device 102. In some instances, application 116 may be a video-playing application for streaming videos from computing device 102 to computing device 104, possibly for displaying the video on a larger display of computing device 104. Further, application 118 may be a presentation application, a word application, and/or a spreadsheet application for sending information from computing device 102 to computing device 106, possibly for modifying the information using the graphical user interface (GUI) of computing device 106. Yet further, application 120 may be a smart phone application for transmitting data between computing device 102 and computing device 108. The various applications of computing device 102 may also take the form of a payment application that may communicate payment information to one of computing devices 104, 106, and 108. In yet further embodiments, applications of computing device 102 may also take the form of an application to find nearby computing devices, such as a computing device 108.

Figure 2:
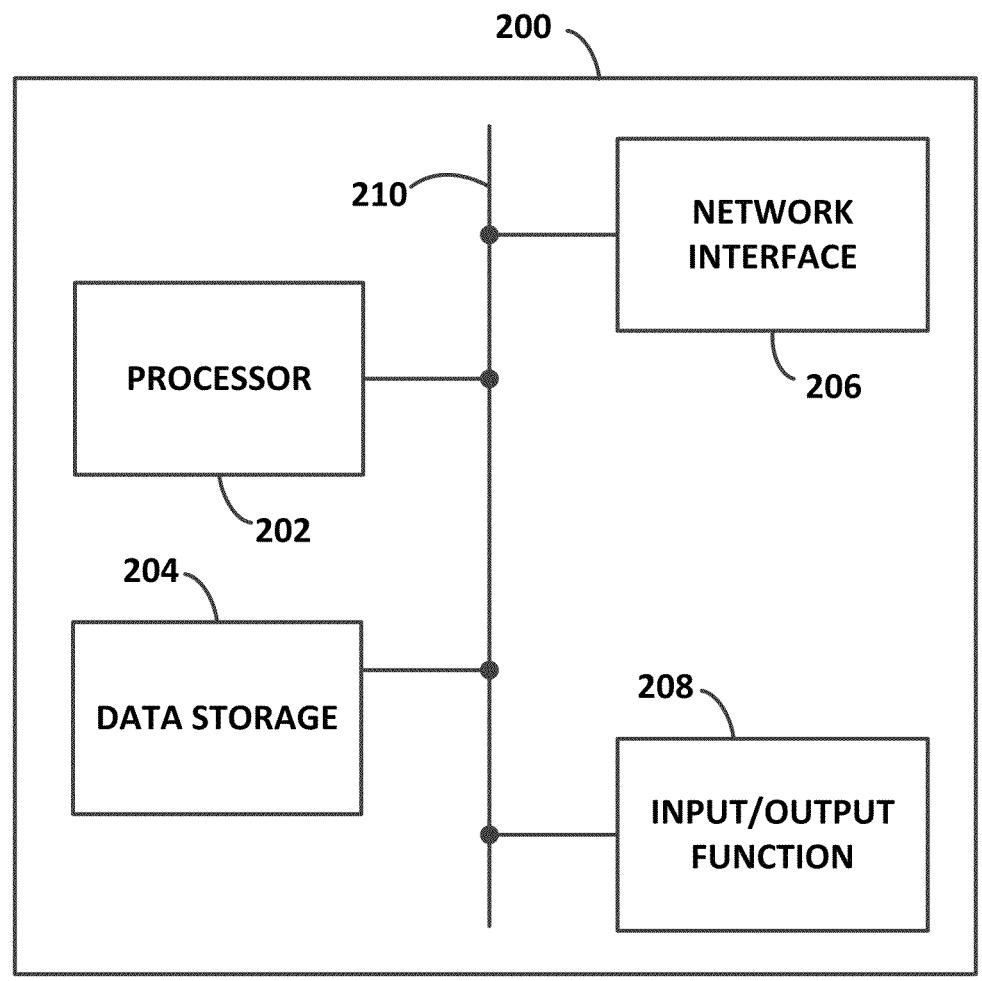
FIG. 2 illustrates a schematic drawing of an example computing device.

FIG. 2 illustrates a schematic drawing of an example computing device. In some instances, computing device 200 may, for example, take the form of any computing device described above in relation to FIG. 1 or a similar device that may be configured to perform the methods and functions described herein. In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits, digital signal processors, network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireless connection, such as BLUETOOTH®. In particular, network interface 206 may enable one or more Bluetooth standards or protocols, including BLE protocols and related advertising protocols. Further, network interface 206 may include a radio for transmitting advertising packets to other computing devices. For example, referring back to FIG. 1, computing device 102 may also include network 206 to pair with computing device 104 through 106. In addition, network interface 206 may take the form of other wireless connections such as IEEE 802.11 (Wi-Fi), or a wide-area wireless connection. However, other forms of physical layer connections and other types of standard or proprietary communication protocols may be used over network interface 206. Furthermore, network interface 206 may comprise multiple physical interfaces. Further, network interface 206 may take the form of a wireline connection, such as an Ethernet connection.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, the computing device 200 may include a device platform or operating system (not shown). In some instances, the device platform or the operating system may be compatible with Bluetooth, Bluetooth Low Energy (BLE) protocols, and/or BLE advertising protocols. In some instances, the device platform or the operating system may be configured as a multi-layered Linux platform or operating system. The device platform may include different applications and an application framework, as well as various kernels, libraries, and runtime entities. In other examples, other formats or systems may operate the computing device 200 as well.

In some embodiments, one or more computing devices may be deployed in a networked architecture, possibly as illustrated in FIG. 1. The exact physical location, connectivity, and configuration of the computing devices may be unknown and/or unimportant to other computing devices. Accordingly, the computing devices in FIGS. 1 and 2 may be referred to as "cloud-based" devices that may be housed at various remote locations.

Figure 3:
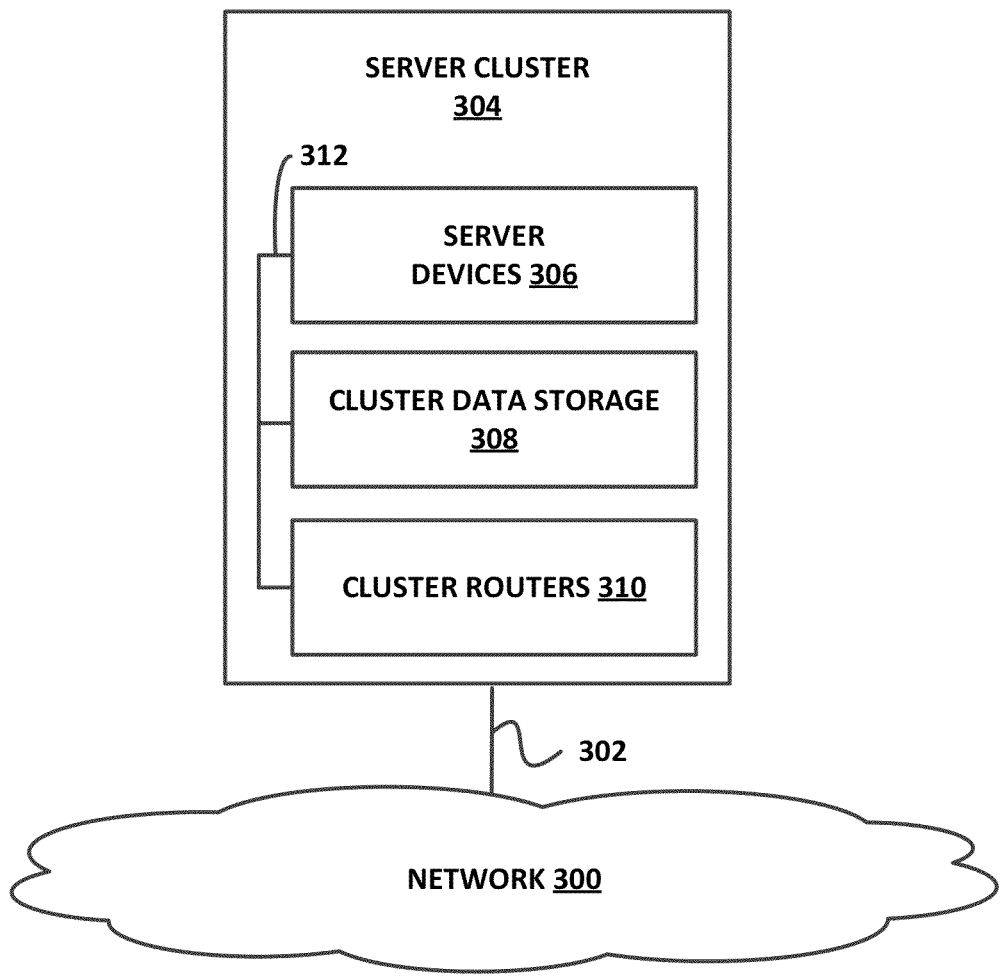
FIG. 3 illustrates a schematic drawing of an example networked server cluster.

FIG. 3 illustrates a schematic drawing of a networked server cluster. In particular, server devices 306 may, for example, take the form of any computing device described above in relation to FIGS. 1 and 2. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

Figure 4A:
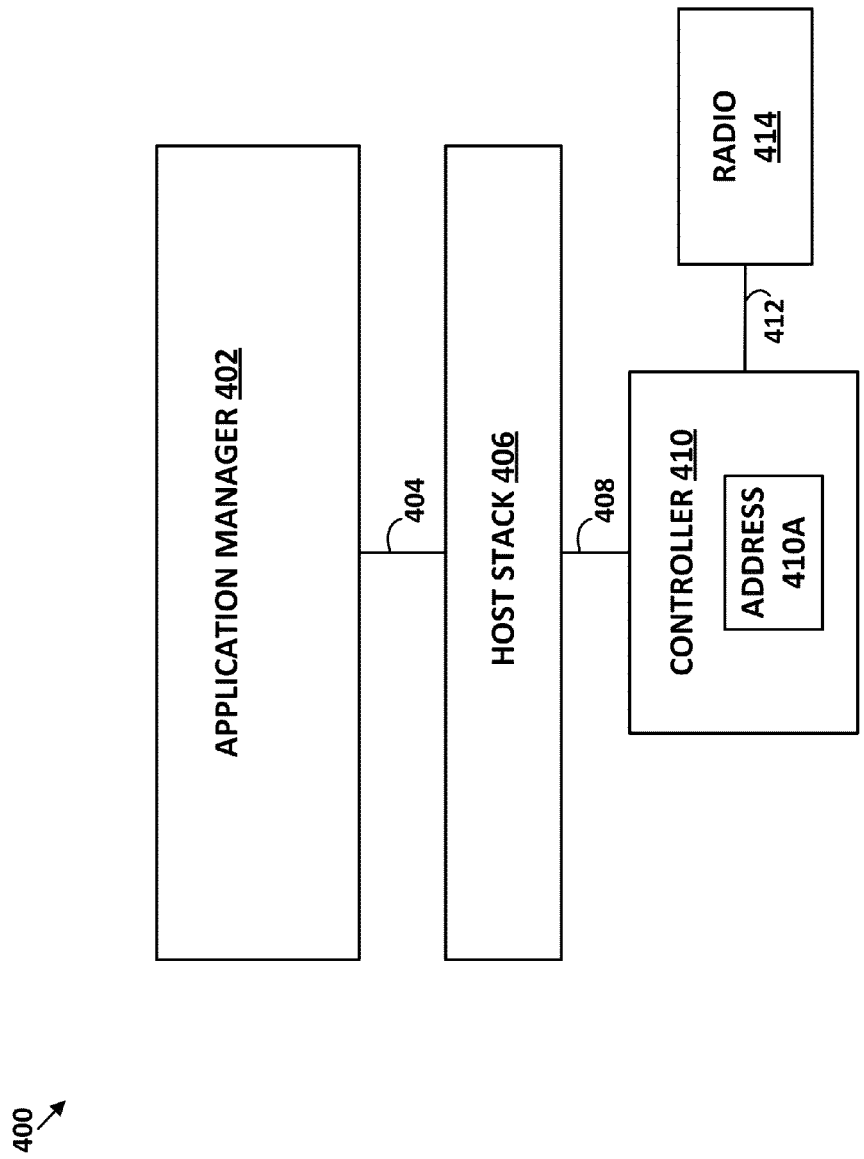
FIG. 4A illustrates a schematic drawing of example Bluetooth device.

FIG. 4A illustrates a schematic drawing of an example Bluetooth device. In particular, Bluetooth device 400 may, for example, be combined with any of the computing devices described in the scenarios above. In some instances, Bluetooth device 400 may be incorporated into any of the computing devices described above, possibly as a Bluetooth module. For example, as in the scenarios above, Bluetooth device 400 may be incorporated into the computing device for sending advertisement packets to the wireless head set and the portable keyboard.

In this example, Bluetooth device 400 includes application manager 402, host stack 406, controller 410, and radio 414. In particular, application manager 402 may be coupled to host stack 406 by system bus 406 or a similar mechanism. Further, host stack 406 may be coupled to controller 410 by system bus 408 or a similar mechanism. Yet further, controller 410 may be coupled to radio by system bus 412 or similar mechanism.

Controller 410 may include a physical Bluetooth controller interface. Further, the physical Bluetooth controller interface may correspond to physical Bluetooth static random (BSR) address 410A, possibly for transmitting an advertisement packet for an application downloaded on the Bluetooth device 400. For example, referring back to the scenarios above, consider that Bluetooth device 400 is incorporated with the computing device. As such, the music-playing application may be downloaded to Bluetooth device 400. Further, controller 410 may correspond to BSR address 410A for transmitting an advertisement packet for the music-playing application.

Bluetooth device 400 may operate in different modes depending on the functionality. In some instances, the functionality of Bluetooth device 400 may be controlled by a user of Bluetooth device 400. Considering the scenarios above, the user may provide an input to Bluetooth device 400 or to computing device 200, possibly a computing device, that may be combined with Bluetooth device 400. In particular, the user may provide an input to input/output function 208, possibly a graphical user-interface (GUI), to initiate the music-playing application and stream music to a wireless headset. As such, the operating modes of Bluetooth 400 may include an advertising mode.

In some embodiments, the advertising mode involves the Bluetooth device 400 periodically transmitting advertising packets. Further, Bluetooth device 400 may respond with more information upon requests from other devices. In addition, Bluetooth 400 may have other modes such as a scanning mode, a master device mode, and a slave device mode. In some embodiments, the scanner mode involves Bluetooth device 400 listening for advertisement packets transmitted by other devices.

In some embodiments, the Bluetooth device 400 may be in advertisement mode to establish a connection with another computing device. For example, referring again to the scenarios above, consider that Bluetooth device 400 is incorporated with the computing device. As such, the wireless headset may scan for a desirable advertising packets sent by Bluetooth device 400. Upon receiving the advertisement packet, the wireless headset may send a pairing or connection request to Bluetooth device 400. Once the pairing is established, the wireless headset may become the slave device and the Bluetooth device 400 may become the master device.

Figure 4B:
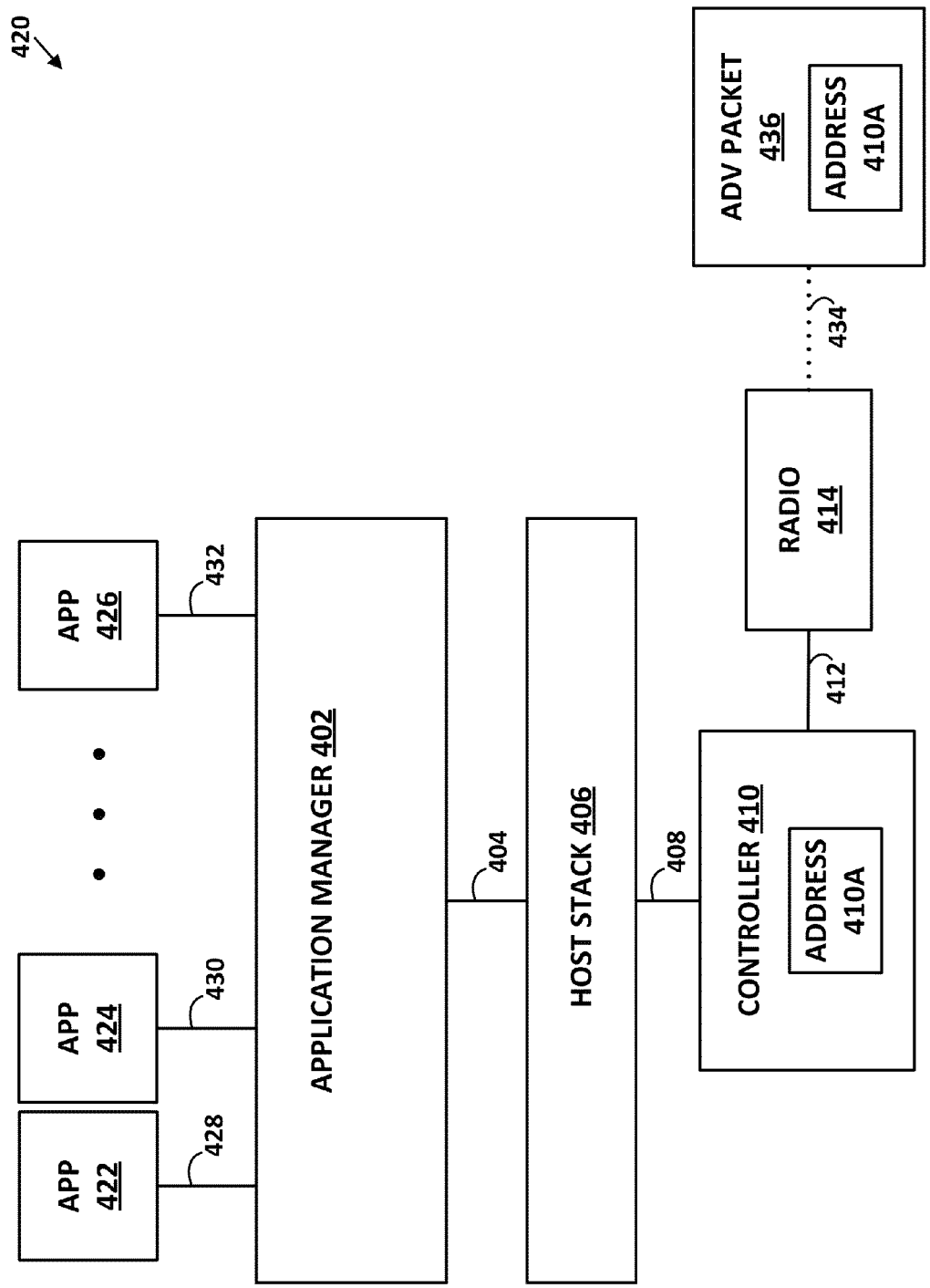
FIG. 4B illustrates a schematic drawing of another example Bluetooth device.

FIG. 4B illustrates a schematic drawing of another example Bluetooth device. In particular, Bluetooth device 420 may, for example, take the form of any of the computing devices and Bluetooth devices described above in relation to FIGS. 1 through 4A. For example, as illustrated in FIG. 4A, Bluetooth device 420 also includes application manager 402, host stack 406, controller 410, and radio 414. Further, application manager 402 may be coupled to host stack 406 by system bus 404 or a similar mechanism. Further, host stack 406 may be coupled to controller 410 by system bus 408 or a similar mechanism. Yet further, controller 410 may be coupled to radio by system bus 412 or similar mechanism.

Applications 422, 424, and 426 may be downloaded on Bluetooth device 420 and/or on a computing device combined with Bluetooth device 420. In some instances, applications 422, 424, and 426 may, for example, take the form of applications 116, 118, and 120, respectively as described above in relation to FIG. 1. Further, applications 422, 424, and 426 may exchange advertisement data with application manager 402 through application interfaces 428, 430, and 432, respectively. Further, additional applications may attempt to exchange advertisement data with application manager 402, as designated by the ellipses between applications 424 and 426. Yet further, applications 422, 424, and 426 may communicate with application manager 402 to exchange an advertisement packet with other devices (not shown in FIG. 4).

In some embodiments, Bluetooth device 420 may enter advertisement mode to transmit an advertisement packet over the air for applications 422, 424, and 426. As noted, controller 410 may be assigned a single Bluetooth static address 410A for transmitting advertisement packets to other computing devices. For example, Bluetooth device 420 may create advertisement packet 436 to include BSR address 410A. As such, advertisement packet 436 may be transmitted through radio 414 for one or more of applications 102, 104, and 106.

Figure 4C:
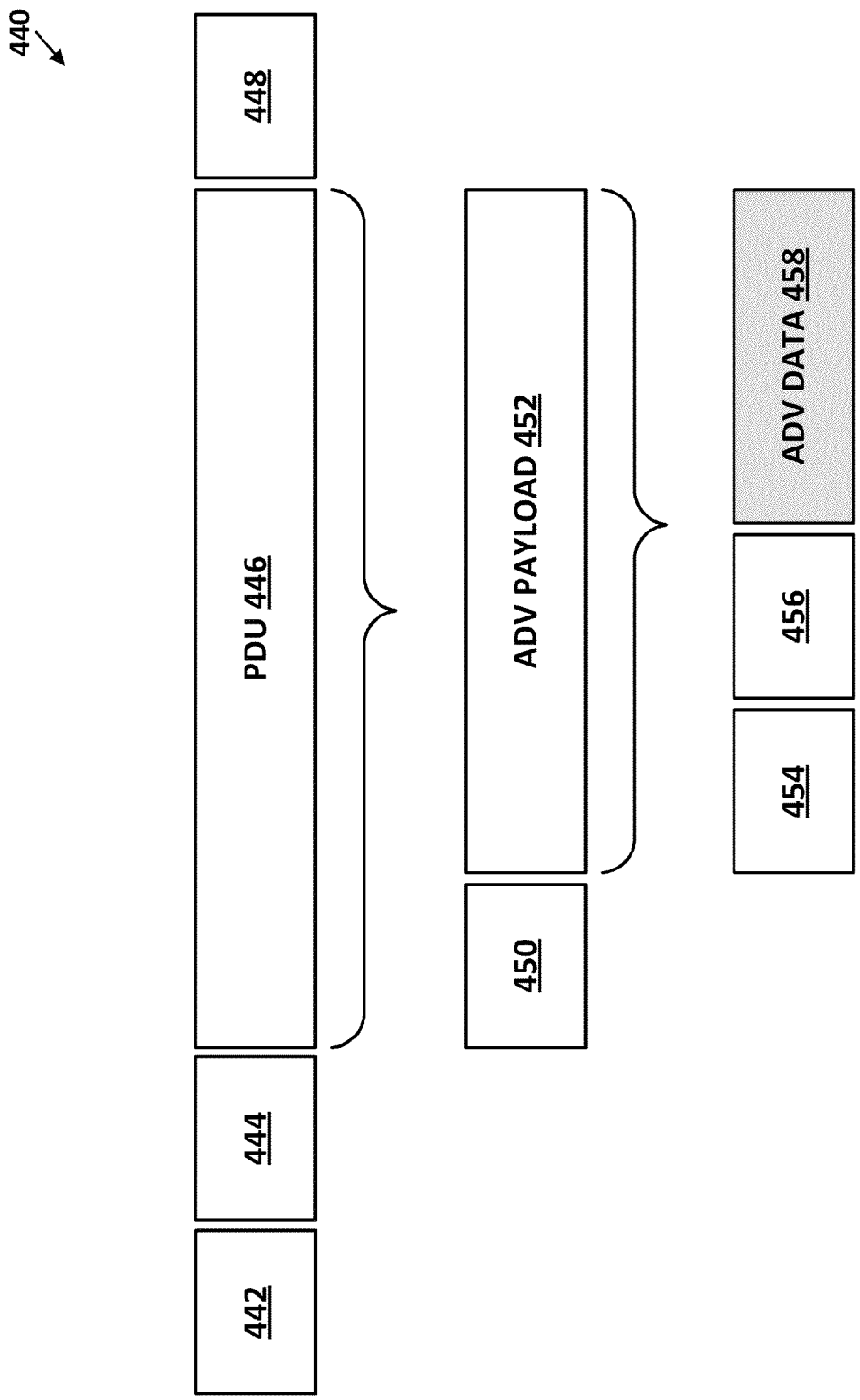
FIG. 4C illustrates an example advertisement packet.

FIG. 4C illustrates an example advertisement packet. In particular, advertisement packet 440 may, for example, take the form of any advertisement packets described above in relation to the FIGS. 1 through 4B. As shown in FIG. 4C, advertisement packet 440 may include preamble 442, access address 444, payload data unit (PDU) 446 with 2 to 39 bytes, and cyclic redundancy check (CRC) 448.

In addition, PDU 446 may include header 450 and advertisement payload 452 with 6 to 37 bytes. Further, advertisement payload 452 may include header 454, MAC address 456, and advertisement data 458 with up to 31 bytes. As noted in the scenarios above, this 31 byte space may limit the advertisement data that may be transmitted for applications 422, 424, and 426. In particular, computing device 420 may transmit a single advertisement packet 436 for possibly one or two of applications 422, 424, and 426. For example, the 31 byte space may allow for advertisement data of applications 422 and 424, but probably not application 426 (in one example). Yet, in some instances, additional applications may be present as designated by the ellipses between applications 424 and 426 in FIG. 1. As such, additional applications may encounter a waiting period to transmit advertisement data due to the 31 byte space limitation and the single Bluetooth static address 118A.

Figure 5:
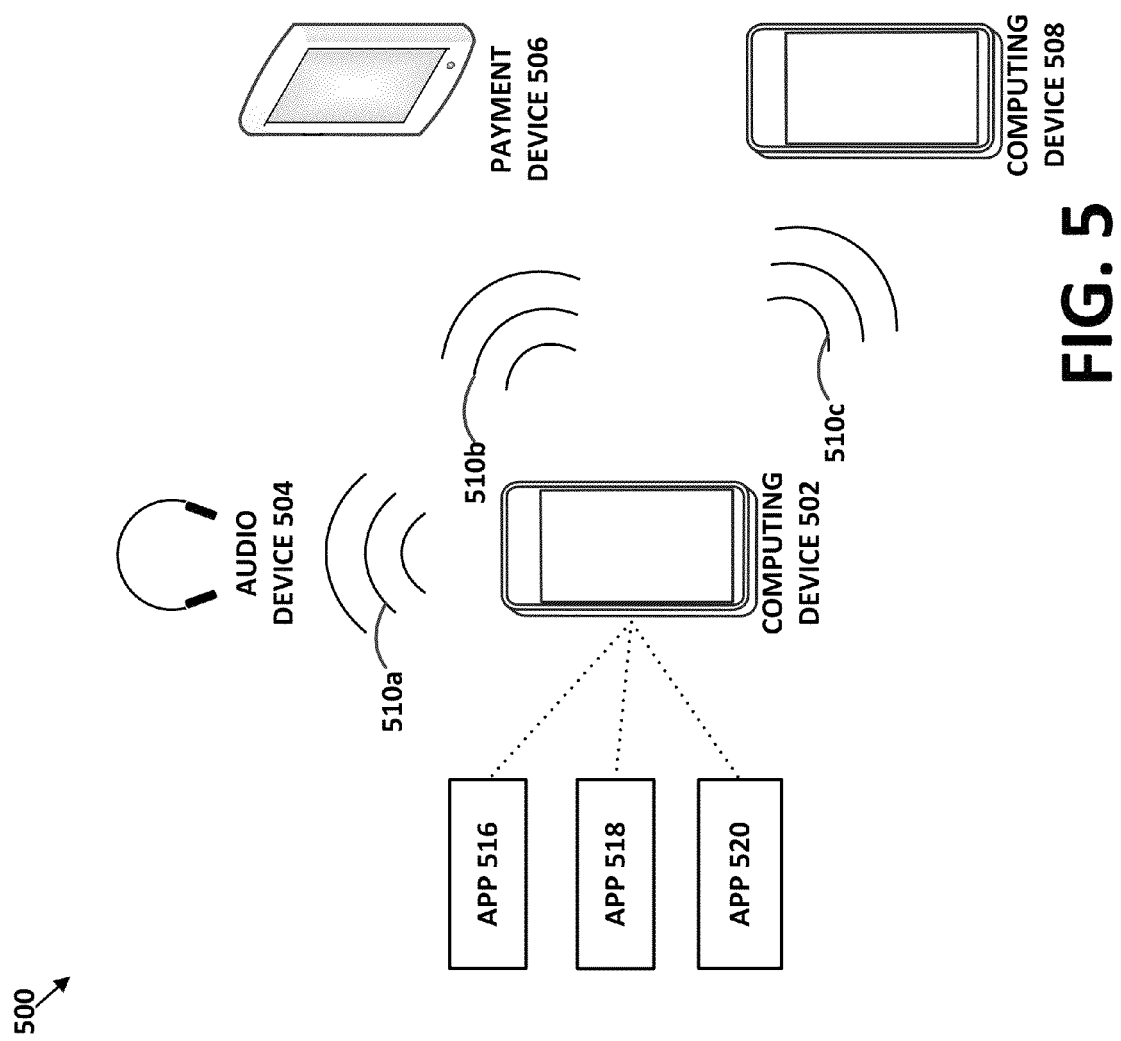
FIG. 5 illustrates an example computing device transmitting advertisement packets.

FIG. 5 illustrates an example computing device 502 transmitting advertisement packets 510a-510c to various devices. As previously discussed with respect to FIG. 1, computing device 502 may pair or connect to various devices. Here, computing device 502 may be configured to pair or connect with an audio device 504, a payment device 506, and/or another computing device 508. In addition, the connections between the computing device 502 and the various devices may be point-to-point wireless connections such as Bluetooth Low Power Energy (LPE) connections, among other types of connections.

In some instances, computing device 502 may include a number of applications. For example, the computing device 102 may for example, execute applications 516, 518, and 520. In some instances, application 516 may be an audio-playing application for streaming audio from computing device 502 to computing device 504. Further, application 518 may be a financial or payment application for sending information from computing device 502 to payment device 506, possibly for completing a financial transaction with computing device 506. Yet further, application 520 may be a smart phone application for transmitting data between computing device 502 and computing device 508, such a "find a friend" application.

Computing device 502 may operate in an advertising mode, similar to that discussed with respect to FIG. 4A. While operating in the advertising mode, the computing device 502 may transmit at least one advertising packet, shown in FIG. 5 as advertisement packets 510a-510c. As shown in FIG. 5, advertising packet 510a may be communicated by the computing device 502 to establish a connection between the computing device and the audio device 504. Similarly, advertising packet 510b may be communicated by the computing device 502 to establish a connection between the computing device and the payment device 506. Further, advertising packet 510c may be communicated by the computing device 502 to establish a connection between the computing device and the computing device 508.

Although each of advertisement packets 510a-510c have an intended recipient device, any device capable of receiving an advertisement packet may be able to receive any of advertisement packets 510a-510c that are transmitted within a range of the device. Thus, it may be desirable to control the range at which an advertisement packet may be received. In order to control the range at which a packet may be received, the power with which an advertisement packet is transmitted may be adjusted. By controlling the transmission power of advertisement packets, the range at which an advertisement packet can be received may be controlled.

The range of transmission for an advertisement packet may be controlled for several reasons. For example, with respect to an audio application, the range for transmission of an advertisement packet may be short in order to try and limit the number of audio devices that may receive the packet. In another example, with respect to a financial or payment application, the range for transmission of an advertisement packet may be short in order to try and limit the number of payment devices (or other devices) that may receive the packet. In yet another example, with respect to a "find a friend" application, the range for transmission of an advertisement packet may be significantly larger than the other examples in order to try and make the recipient computing device within range of the advertisement packet. However, in some embodiments, the transmission of an advertisement packet, such as an advertisement packet transmitted by a "find a friend" application, may be received, and responded to, by many computing devices. The computing device 502 may responsively decrease the transmission power of the advertisement packet transmitted by a "find a friend" application in order to reduce a number of computing devices that receive and respond to the advertisement packet.

In yet another embodiment, the range of transmission for an advertisement packet may be controlled based on a battery power level of the computing device. Because transmitting an advertisement packet with a higher power level uses more energy stored in a battery of a computing device, a computing device may adjust the range of transmission by lowering the transmission power in order to reduce battery usage. In another embodiment, the computing device may iteratively increase the range of transmission by iteratively increasing the transmission power in order to transmit the advertisement packet with the lowest power level to achieve a successful connection.

FIG. 6 shown an example chart 600 of various applications 602, the associated transmission range 604 for advertisement packets, power level 606 for advertisement packets, and application programming interface (API) 608. The chart 600 represents data stored in the computing device for the purpose of adjusting power levels to control transmission ranges. The ranges and power levels are merely for explanation purposes. They in no way are meant to be examples of real world power levels and ranges. The information in chart 600 may be stored in a computing device as data, such as in a memory or in a database. Further, in a real world application, chart 600 may have more entries that what is shown in FIG. 6. Additionally, in some embodiments, the chart stored in a computing device may omit some of the columns or rows shown in FIG. 6. For example, in some instances, chart 600 may not include the application information. In these examples, an API may control the distance or range. In other examples, chart 600 may not include the API information. In these examples, the application may control the distance or range. In yet further embodiments, the range row may be omitted. Because range is a function if the transmission power, it may not be necessary to have an entry for both range and power level.

Each application that transmits advertisement packets may have a corresponding entry in chart 600. In some embodiments, the corresponding entry may be the application name. In other embodiments, the corresponding entry may be the API the application uses for advertisement packet transmission. In yet another embodiment, the corresponding entry may be based on an application category (e.g. social networking, location, payment, media, etc.). In even further embodiments, an application may have no corresponding entry in the chart 600. Other embodiments may include a operating system or platform level determination about the advertisement packet. For example, the operating system or platform may determine a desired range or transmission power level for each advertisement packet. In this situation, the advertisement packet associated with the application may be transmitted based on a nominal power of advertisement packet transmission. The nominal power for advertisement packet transmission may be the maximum or normal transmission power based on the specific Bluetooth hardware in the computing device. The adjusted power of the advertisement packet transmission may generally be less than the nominal transmission power.

As example chart 600 shows, the first row indicates various applications 602. The second row shows the associated transmission range 604 for each application. The third row shows the power level 606 for each application. And, the fifth row shows the API 608 for each application.

In the first example, a Payment Application may have an associated transmission range of 1 foot for advertisement packets. The power level for a 1 foot transmission range may be −60 dBm (dBm being decibels relative to one milliwatt of transmission power). Additionally, the Payment Application may call the advertisement packet to be transmitted via a Payment API. In the second example, an Audio Application may have an associated transmission range of 4 feet for advertisement packets. The power level for a 4 feet transmission range may be −28 dBm. Additionally, the Audio Application may call the advertisement packet to be transmitted via a Personal Audio API. In the third example, a "Find a Friend" Application may have an associated transmission range of 100 feet for advertisement packets. The power level for a 100 feet transmission range may be 10 dBm. Additionally, the "Find a Friend" Application may call the advertisement packet to be transmitted via a Friend Finder API. In the fourth example, a Location Detection Application may have an associated transmission range of 50 feet for advertisement packets. The power level for a 50 feet transmission range may be −4 dBm. Additionally, the Location Detection Application may call the advertisement packet to be transmitted via a Location API.

In some additional embodiments, each advertisement packet may also have a lower bound for transmission power as well. For example, an Audio Application may have an associated transmission range of 4 feet for advertisement packets. The power level for a 4 feet transmission range may be −28 dBm. The Audio Application advertisement packet may also have a minimum power level of −35 dBm. Thus, the transmission of an advertisement packet associated with an audio application will have a transmission power level between −28 and −35 dBm. Similar to the above discussion, the minimum power level for an advertisement packet may be determined based on either the application or an API associated with the application.

Figure 7:
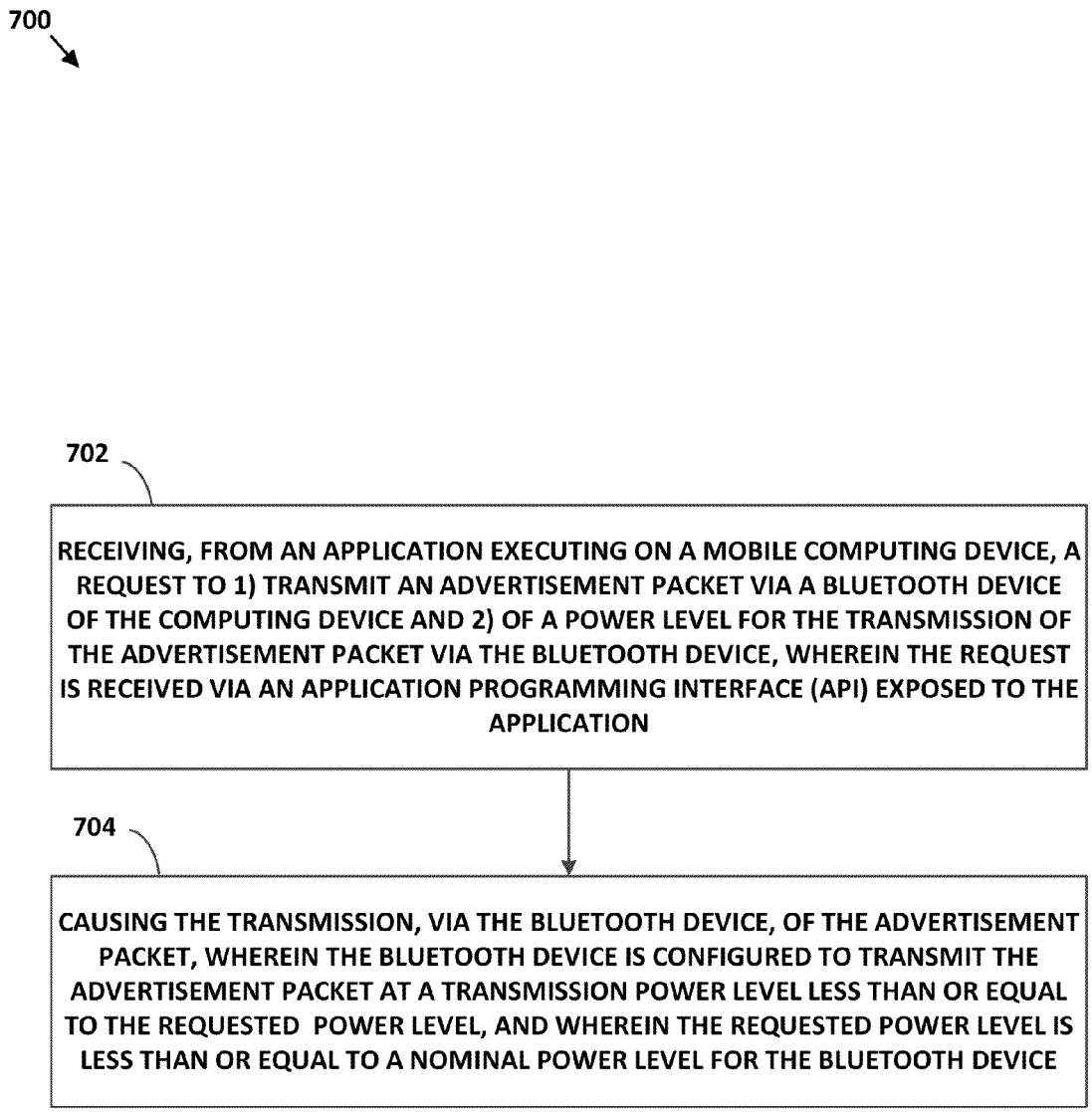
FIG. 7 illustrates a flow diagram of an example method for adjusting the range of transmission of Bluetooth advertising packets.

FIG. 7 illustrates a flow diagram of an example method for adjusting the range of transmission of short-range wireless advertising packets. In particular, method 700 of FIG. 7 may be carried out or implemented by one or more of the computing devices described above in relation to FIGS. 1 through 5. For example, method 700 may be carried out by computing device 102 in FIG. 1 to send advertisement packets and pair with computing devices 104, 106, and 108. Further, methods 700 may include one or more steps, processes, and/or functions as illustrated by one or more of blocks 702 and 704. Although the blocks are illustrated in a sequential order, a number of these blocks may also be performed simultaneously and/or in a different order than those illustrated. Also, the various blocks may be combined into fewer blocks, divided into additional blocks, and/or removed based upon specific implementations. Further, some blocks may be performed iteratively or more than once.

At block 702, the method 700 includes receiving, from an application executing on a mobile computing device, a request 1) to transmit an advertisement packet via a short-range wireless device of the computing device and 2) of a power level for the transmission of the advertisement packet via the short-range wireless device, wherein the request is received via an application programming interface (API) exposed to the application.

A mobile device may include a number of applications configured to communicate with a short-range wireless (e.g. Bluetooth) device. As shown in FIG. 4B, a number of applications 422, 424, and 426 may be determined to communicate with Bluetooth device 420. As noted, applications 422, 424, and 426 may be downloaded on Bluetooth device 420. Further, application manager 420 may determine applications 422, 424, and 426 are configured to communicate with application manager through application interfaces 428, 430, and 432, respectively. In particular, applications 422, 424, and 426 may attempt to exchange advertisement data with application manager 402 to request to transmit advertisement packet 436 to other devices (not shown in FIG. 4).

Advertisement packets may be requested by the first application in a similar manner as previously discussed with respect to FIG. 4B. For example, an application executed on a computing device may include a Bluetooth operation mode. The Bluetooth operation mode may specify a type of device with which to establish a Bluetooth connection. In response to the computing device executing the application, a processor in the computing device may cause an advertisement packet to be determined for transmission by a Bluetooth unit in the computing device. The advertisement packet may function to establish a Bluetooth connection between the computing device and a different Bluetooth device.

In some embodiments, the computing device may execute more than one application at a time. In these embodiments, the computing device may determine an advertisement packet for each application that includes Bluetooth functionality. For example, a computing device may execute a music application and a find a friend application concurrently. The computing device may determine an advertisement packet for each of the music application and the find a friend application. The music application may have an advertisement packet configured to connect with a music playback device and the find a friend application may have an advertisement packet configured to communicate with nearby computing devices.

The power level for the one or more advertisement packets is based on an API of a respective application associated with a respective advertisement packet. Additionally, the determined power level for each of the one or more advertisement packets may be less than a nominal power level of the advertisement packets. The nominal power level is a power level corresponding to the default Bluetooth advertisement packed power transmission level of the Bluetooth device.

As discussed with respect to FIGS. 5 and 6, a power level for an advertisement packet may be determined based on the application associated with the advertisement packet. In some embodiments, the power level may be determined in response to the application requesting the transmission of an advertisement packet. By adjusting the power level of an advertisement packet, the transmission range of a given advertisement packet may be adjusting. For example, an advertisement packet with an unadjusted transmission power (i.e. a default Bluetooth advertisement packed power transmission level of the Bluetooth device) may have a range of 150 feet. The unadjusted transmission power may be a nominal power level, such as 13 dBm. Additionally, the default nominal power level may be a maximum transmission power level for advertisement packets. However, in some instances, it may desirable to limit the range of an advertisement packet. For example, it may desirable to limit the transmission distance of an advertisement payment associated with a payment application to 5 feet. Thus, the transmission power of the associated advertisement packet may be reduced.

The power level for the one or more advertisement packets may be determined in a variety of ways, as previously discussed. In one embodiment, each application may have an associated power level (or transmission range) with which the power level for the advertisement packet may be determined. In another embodiment, each application may have an associated API, and the API may define the power level (or transmission range) with which the power level for the advertisement packet may be determined.

In some embodiments, several applications may have a common API, thus in embodiments where the API determines the associated power level (or transmission range), the several applications may have the same associated power level (or transmission range). Because the nominal power level associated with advertisement packets may be a maximum transmission power of advertisement packets, the adjusted power level may be less than the nominal power level of advertisement packets. The power levels for various applications (or APIs) may be stored in a memory of the computing device.

In some embodiments, the computing device may have the ability to receive data and store revised power levels for advertisement packets. For example, an application may receive an update that revises the power levels associated with the transmission of the advertisement packets of the application. In yet another example, an operating system of the computing device may control the power level of advertisement packets based on APIs of the various application. The operating system of the computing device may receive updated data to revise the power level associated with various advertisement packets. Other examples of updating the data related to the power level of advertising packets are possible as well.

At block 704, the method 700 further includes causing the transmission, via the short-range wireless device, of the advertisement packet. Wherein the short-range wireless device is configured to transmit the advertisement packet at a transmission power level less than or equal to the requested power level. And, where the requested power level is less than or equal to a nominal power level for the short-range wireless device A short-range wireless unit of the computing device may receive an instruction from a processor (or other unit) of the computing device and responsively transmit an advertisement packet with a power level less than or equal to a maximum power level determined for the advertisement packet. In some additional embodiments, the short-range wireless unit may responsively transmit an advertisement packet with a power level greater than or equal to a minimum power level also determined for the advertisement packet.

In some embodiments, the method may also include determining a second power level for transmission of a second advertisement packet associated with a second application. Where the power level is based on an application programming interface (API) of the second application. Additionally, the second power level may be different than the first power level with which the first advertisement packet was transmitted. The second power level may be determined in a similar matter to how the first power level was determined at block 702. However, the second power level may be determined for an advertisement packet (i.e. second advertisement packet) from a different application than what the first power level for the first advertisement packet was determined for at block 702. Thus, the second power level may be different than the first power level.

The method may further include causing the transmission, via a radio associated with the short-range wireless device, the second advertisement packet with the second power level, similar to the first advertisement packet being transmitted at block 704. Further, transmitting one of the first advertisement packet and the second advertisement packet may be performed during a pairing associated with the other of the first advertisement packet and the second advertisement packet. Thus, simultaneously, while either the first or second device is pairing with the computing device, the computing device may also transmit an advertisement packet to the other device. Therefore, both pairing acts may be performed at the same time. For example, a first advertisement packet may be transmitted and a second advertisement packet may be transmitted sequentially, without waiting for a response from the transmission of the first advertisement packet. In another embodiment, a first advertisement packet may be transmitted and a second advertisement packet may be transmitted when a response to the first advertisement packet is received, without waiting for the pairing process based on the first advertisement packet to complete.

It should be noted that method 700, other steps, processes, and/or functions disclosed herein show possible implementations of example embodiments. In this regard, each block in FIGS. 4A and 4B may correspond to hardware, chipsets, and/or circuitry that are designed or wired to perform the specific logical functions in method 700. Further, each block in method 700 may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, from an application executing on a mobile computing device, a request 1) to transmit an advertisement packet via a Bluetooth Low Energy (BLE) device of the computing device and 2) of a power level for the transmission of the advertisement packet via the BLE device; and
causing the transmission, via the BLE device, of the advertisement packet, wherein the BLE device is configured to transmit the advertisement packet at a transmission power level less than or equal to the requested power level, and wherein the requested power level is less than a nominal power level for the BLE device, and wherein the nominal power level is an unadjusted advertisement packet power transmission level.

2. The method of claim 1, further comprising:
receiving, from an application executing on a mobile computing device, a minimum power level for transmission of the advertisement packet; and
wherein causing the transmission of the advertisement packet comprises the BLE device being configured to transmit the advertisement packet at a transmission power level greater than or equal to the minimum power level.

3. The method of claim 1, wherein the requested power level is further based on a number of wireless devices within a communication range of the advertisement packet.

4. The method of claim 1, wherein the requested power level is based on one of an application category of the application and an application programming interface (API) exposed to the application.

5. The method of claim 1, wherein the requested power level is based on a maximum communication range associated with the advertisement packet.

6. The method of claim 1, further comprising the mobile computing device receiving a set of advertisement packet data, wherein the advertisement packet data contains data relating to the requested power level for the one or more advertisement packets.

7. The method of claim 1, further comprising:
receiving, from a second application executing on a mobile computing device, a second request 1) to transmit a second advertisement packet via a BLE device of the computing device and 2) of a second power level for the transmission of the advertisement packet via the BLE device; and
causing the transmission, via the BLE device, of the second advertisement packet, wherein the BLE device is configured to transmit the second advertisement packet at a transmission power level less than or equal to the second requested power level, wherein the second requested power level is less than or equal to a nominal power level for the BLE device, and wherein the second requested power level is not equal to the determined power level.

8. A Bluetooth Low Energy (BLE) device comprising;
one or more processors;
a transmitter, configured to transmit, one or more advertisement packets with a power level less than or equal to a determined power level for a respective advertisement packet; and
a non-transitory computer readable medium having stored thereon program instructions that when executed by the one or more processors cause the BLE device to perform functions, the functions comprising:
receiving, from an application executing on a mobile computing device, a request 1) to transmit an advertisement packet via a BLE device of the computing device and 2) of a power level for the transmission of the advertisement packet via the BLE device; and
causing the transmission, via the BLE device, of the advertisement packet, wherein the requested power level is less than a nominal power level for the short-range wireless device, and wherein the nominal power level is an unadjusted advertisement packet power transmission level.

9. The BLE device of claim 8, wherein the functions further comprise:
receiving, from an application executing on a mobile computing device, a minimum power level for transmission of the advertisement packet; and
wherein causing the transmission of the advertisement packet comprises the BLE device being configured to transmit the advertisement packet at a transmission power level greater than or equal to the minimum power level.

10. The BLE device of claim 8, further comprising a receiver, wherein the receiver is configured to receive responses to the advertisement packet and wherein the requested power level is further based on a number of wireless devices within a communication range of the advertisement packet.

11. The BLE device of claim 8, wherein the requested power level is based on one of an application category of the application and an application programming interface (API) exposed to the application.

12. The BLE device of claim 8, wherein the requested power level is based on a maximum communication range associated with the advertisement packet.

13. The BLE device of claim 8, wherein the one or more processors are further configured to receive a set of advertisement packet data and store the set of advertisement packet data in a memory, wherein the advertisement packet data contains data relating to the requested power level for each of the one or more advertisement packets.

14. The BLE device of claim 8, wherein the instruction further comprise:
receiving, from a second application executing on a mobile computing device, a second request 1) to transmit a second advertisement packet via a BLE device of the computing device and 2) of a second power level for the transmission of the advertisement packet via the BLE device; and
causing the transmission, via the BLE device, of the second advertisement packet, wherein the BLE device is configured to transmit the second advertisement packet at a transmission power level less than or equal to the second requested power level, wherein the second requested power level is less than or equal to a nominal power level for the BLE device, and wherein the second requested power level is not equal to the determined power level.

15. A non-transitory computer-readable medium having stored thereon program instructions that when executed by one or more processors cause performance of functions in connection with a Bluetooth Low Energy (BLE) device, the functions comprising:

receiving, from an application executing on a mobile computing device, a request 1) to transmit an advertisement packet via a BLE device of the computing device and 2) of a power level for the transmission of the advertisement packet via the BLE wireless device; and causing the transmission, via the BLE device, of the advertisement packet, wherein the BLE device is configured to transmit the advertisement packet at a transmission power level less than or equal to the requested power level, and wherein the requested power level is less than or equal to a nominal power level for the BLE device, and wherein the nominal power level is an unadjusted advertisement packet power transmission level.

16. The non-transitory computer-readable medium of claim 15, further comprising:

receiving, from an application executing on a mobile computing device, a minimum power level for transmission of the advertisement packet; and wherein causing the transmission of the advertisement packet comprises the BLE device being configured to transmit the advertisement packet at a transmission power level greater than or equal to the minimum power level.

17. The non-transitory computer-readable medium of claim 15, wherein the requested power level is further based on a number of wireless devices within a communication range of the advertisement packet.

18. The non-transitory computer-readable medium of claim 15, wherein the requested power level is based on one of an application category of the application and an application programming interface (API) exposed to the application.

19. The non-transitory computer-readable medium of claim 15, wherein the requested power level is based on a maximum communication range associated with the advertisement packet.

20. The non-transitory computer-readable medium of claim 15, further comprising receiving a set of advertisement packet data, wherein the advertisement packet data contains data relating to the requested power level.

* * * * *